United States Patent [19]

Colombo et al.

[11] E Re. 29,216

[45] Reissued May 10, 1977

[54] RADIOGRAPHIC DISPLAY SYSTEM WITH CASSETTE LOCK

[75] Inventors: Sergio Colombo, Milan; Vitaliano Carugati, Cassano Magnago (VA); Gianni Ferramola, Milan; Sergio Ferrari, Cernusco S. Naviglio, all of Italy

[73] Assignee: Raytheon Company, Lexington, Mass.

[22] Filed: Oct. 20, 1975

[21] Appl. No.: 624,192

Related U.S. Patent Documents

Reissue of:

[64] Patent No.: 3,781,557
Issued: Dec. 25, 1973
Appl. No.: 281,568
Filed: Aug. 17, 1972

U.S. Applications:

[62] Division of Ser. No. 81,214, Oct. 16, 1970, Pat. No. 3,735,132.

[52] U.S. Cl. ..... 250/320; 250/363 S

[51] Int. Cl.[2] ..... G03B 5/17; G01T 1/20

[58] Field of Search ..... 250/363 S, 320

[56] References Cited

UNITED STATES PATENTS

| | | | |
|---|---|---|---|
| 3,070,695 | 12/1962 | Stickney et al. | 250/363 S |
| 3,652,852 | 3/1972 | Miyazawa et al. | 250/71.5 S |

*Primary Examiner*—Davis L. Willis
*Attorney, Agent, or Firm*—David M. Warren; Joseph D. Pannone; Milton D. Bartlett

[57] ABSTRACT

A nuclear imaging device comprising a plurality of scanning heads spaced apart in a predetermined configuration with the aid of a support member that permits the individual scanning heads to scan in parallel, antiparallel, and tomographic modes. The support member which is driven in both X and Y directions is mechanically connected with the stylus of a graphical X-Y plotter via a backlash linkage. Displays are provided wherein the color of the ink dot on printed paper or the intensity of the light projected on photographic film are related to the nuclear particle count in a preselectable manner.

10 Claims, 18 Drawing Figures

FIG. 2A
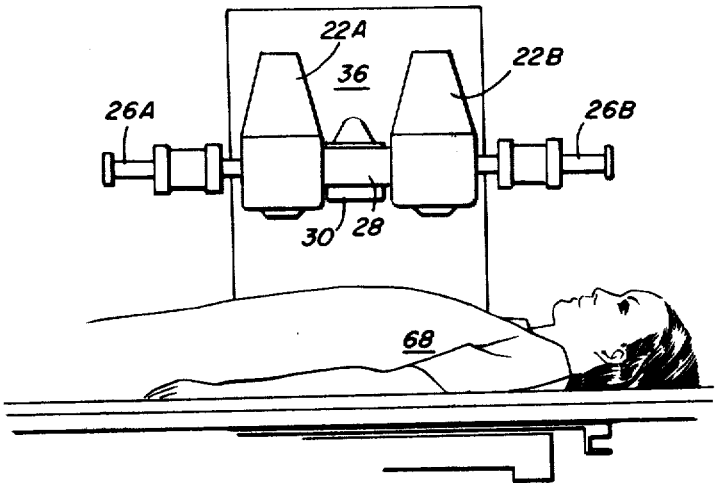
FIG. 2B
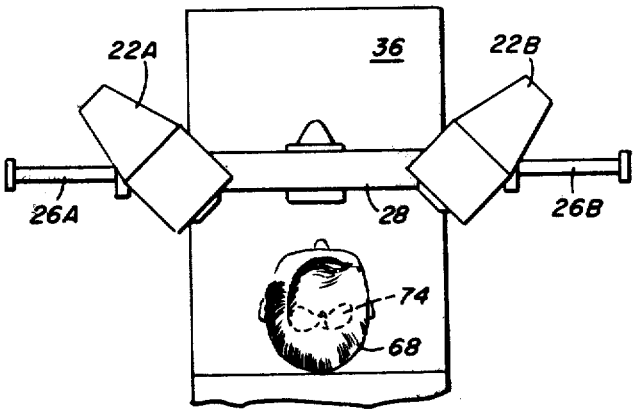
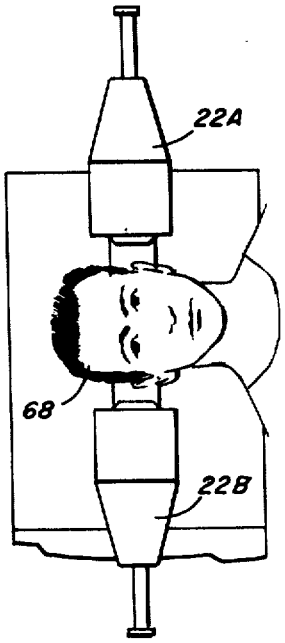
FIG. 2C

FIG. 11
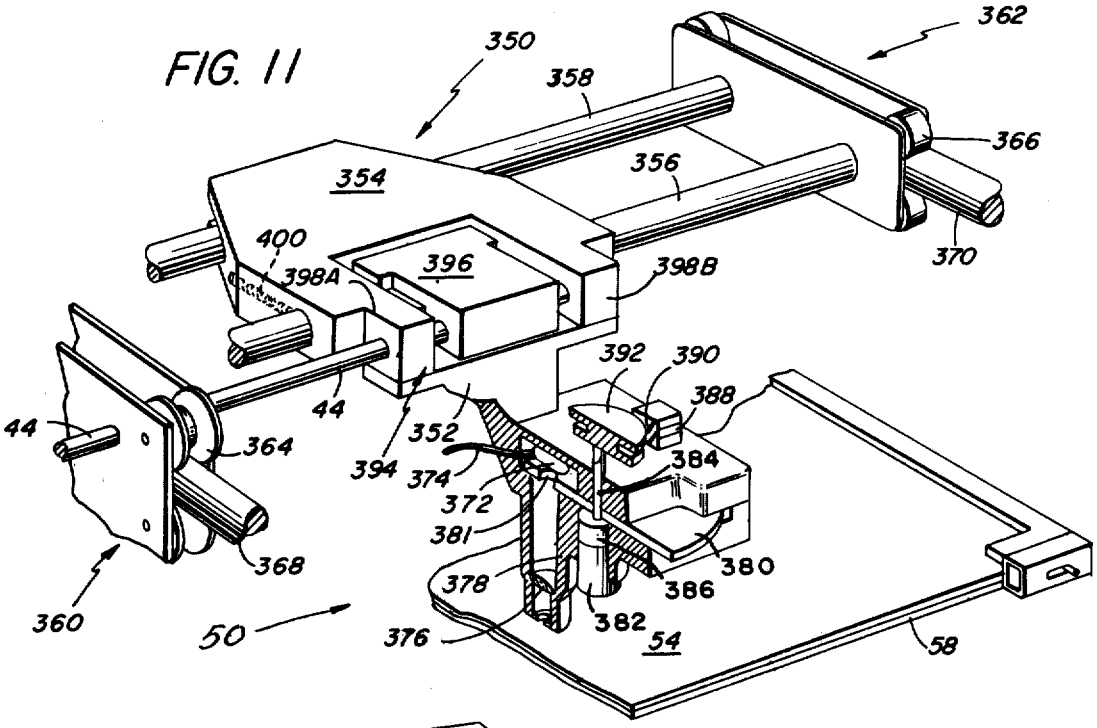
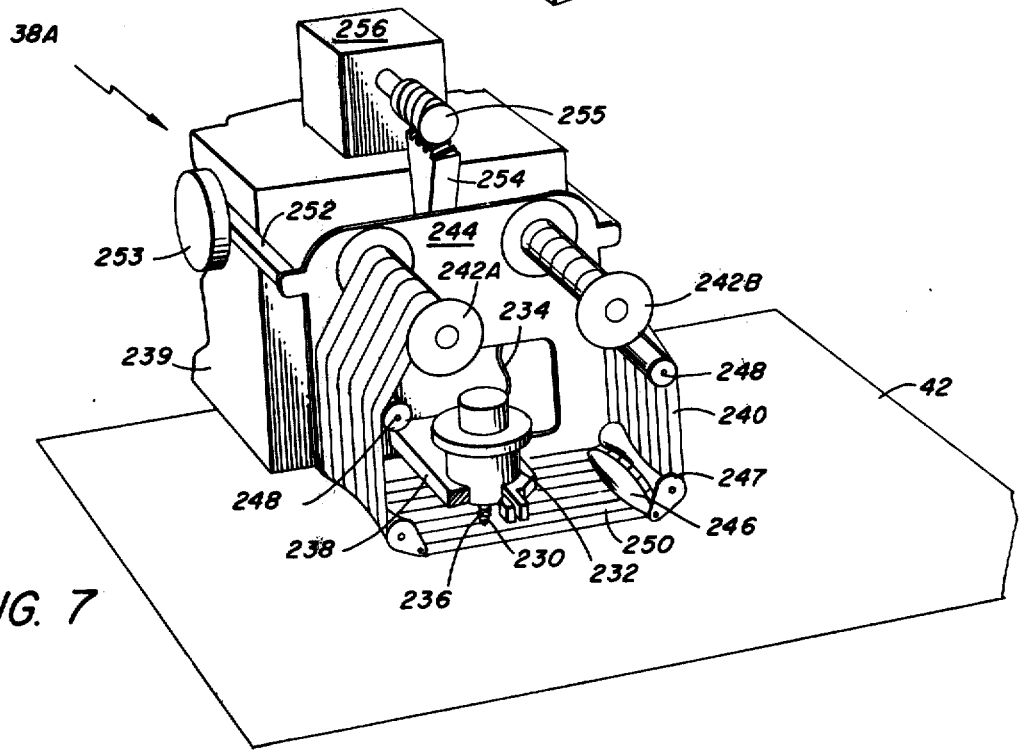
FIG. 7

RADIOGRAPHIC DISPLAY SYSTEM WITH CASSETTE LOCK

Matter enclosed in heavy brackets [ ] appears in the original patent but forms no part of this reissue specification; matter printed in italics indicates the additions made by reissue.

This is a division of application Ser. No. 81,214 filed Oct. 16, 1970 now U.S. Pat. No. 3,735,132.

BACKGROUND OF THE INVENTION

This invention relates to nuclear imaging devices and more particularly to a means for recording data obtained from simultaneous scans by a plurality of scanning heads.

In obtaining an image of a radioactive source it is frequently convenient to use a plurality of scanning heads, for example, a pair of scanning heads, in which the scanning heads may be arranged for parallel scanning, antiparallel scanning or tomographic scanning. In the situation where a human patient is being treated with radio pharmaceuticals and a radiograph of the chest is to be obtained, the scanning heads may be arranged to effect a parallel scan in which one scanning head scans the upper portion of the chest while the other scanning head scans the lower portion of the chest, thereby providing radiographs of the entire chest in half the time. Alternatively, it may be desirable to compare images obtained from scanning the chest from a frontal view and also from a rear view; in this case the scanning heads would be arranged in antiparallel configuration in which one scanning head is positioned above the patient and the other scanning head is positioned beneath the patient. It may also be desirable to provide a tomographic display which is accomplished by positioning the two scanning heads side by side and at an angle to each other to provide two views of a common source of radiation such that the two views are oriented at an angle to each other. In these three situations it is desirable that the two scanning heads be rigidly mounted relative to each other to insure a correspondence between the imaging points on the two radiographs provided by the two scanning heads, but since the plurality of scanning heads are to be supported in a fixed configuration by a rigid member, provision must also be made for varying the orientation of these scanning heads to provide the different modes of scanning, and furthermore, the scanning heads must be connected to writing heads which provide the radiographs.

An attempt to solve the foregoing problem was made by D. E. Kuhl as shown in "Progress in Medical Radioisotope Scanning," pages 186 and 187, published by the U.S. Atomic Energy Commission, and in "Clinical Scintillation Scanning," edited by L. M. Freeman and P. M. Johnson, page 34, published by Harper & Row. Kuhl's scanning apparatus comprises a large complex mechanism which is cumbersome for a small hospital installation.

A further problem arises in the interpretation of the radiographs. Radiographs are generally read visually and the interpretations made from the radiograph are based on the capability of an observer for reading these radiographs. In particular the observer must be able to distinguish between radiations of higher and lower intensities. While X-Y plots in color have been utilized, the relationship between the selection of color or gray scale is preset and cannot be varied to suit the particular situaton or the particular observer.

An additional problem commonly known as "scalloping" is found in X-Y plots produced by imaging systems which are responsive to the counting of nuclear particles, such as gamma ray photons, emitted by the source of radiation. In such imaging systems the count of the quanta of radiation are scaled such that a point is provided on the radiograph for a specified number of counts. As the scanning head is moved along during a scanning operation, the count is accumulated so that at the end of some small region of the radiograph, an image point or mark is printed upon the X-Y plot. At the end of a scanning line when the direction of the scanning head is reversed it becomes apparent that two image points will be printed on the X-Y plot corresponding to the same X displacement, these two points having different values in the X dimension. This is the so-called scalloping effect, and it is desirable to provide an imaging system which precludes this scalloping.

SUMMARY OF THE INVENTION

This invention provides for an imaging system in which a plurality of transducers or scanning heads are mounted on a positioning means comprising a rigid transport beam, a rigid frame rotatably mounted thereon, and a plurality of arms slidably and rotatably attached to the frame. Moving means are provided for moving the positioning means in an X direction in which the main beam is displaced along its axis and in a Y direction in which the transport beam is displaced in a direction perpendicular to its axes. The transport beam also mechanically moves a writing head which provides a colored image on an XY plot, and is further connected to two photoheads for providing two radiographs on photographic film, one radiograph corresponding to each of the scanning heads, or alternatively, to a combination of the data of two scanning heads. The direct mechanical connection provides for the correlation of data obtained from the scanning with position on the radiograph. A backlash device interconnects the printing head with the main beam such that upon a reversal in the scanning direction by the transport beam there is a momentary lag in motion of the writing head to permit the positioning means to move a short distance for accumulating a count of nuclear particles before a mark is imprinted on the X-Y plot. There is also disclosed means for varying the responsivity of the color coding in a colored radiograph as well as the responsivity of the gray code in a photographic radiograph as a function of the count of the quanta of radiant energy impinging upon the scanning heads.

In addition, this invention provides a film lock preventing accidental exposure of a photographic radiograph and a means for indicating when a writing head has been set for two high a writing rate.

BRIEF DESCRIPTION OF THE DRAWINGS

The aforementioned objects and other features of the invention are explained in the following description taken in connection with the accompanying drawings wherein:

FIGS. 2A, 2B and 2C show various configurations for arranging the scanning heads of the imaging system of the invention;

FIG. 7 is an isometric view of a writing head;

FIG. 11 is an isometric view, partially in section, of a photohead and its transport mechanism;

DESCRIPTION OF THE PREFERRED EMBODIMENT

Figure 1:
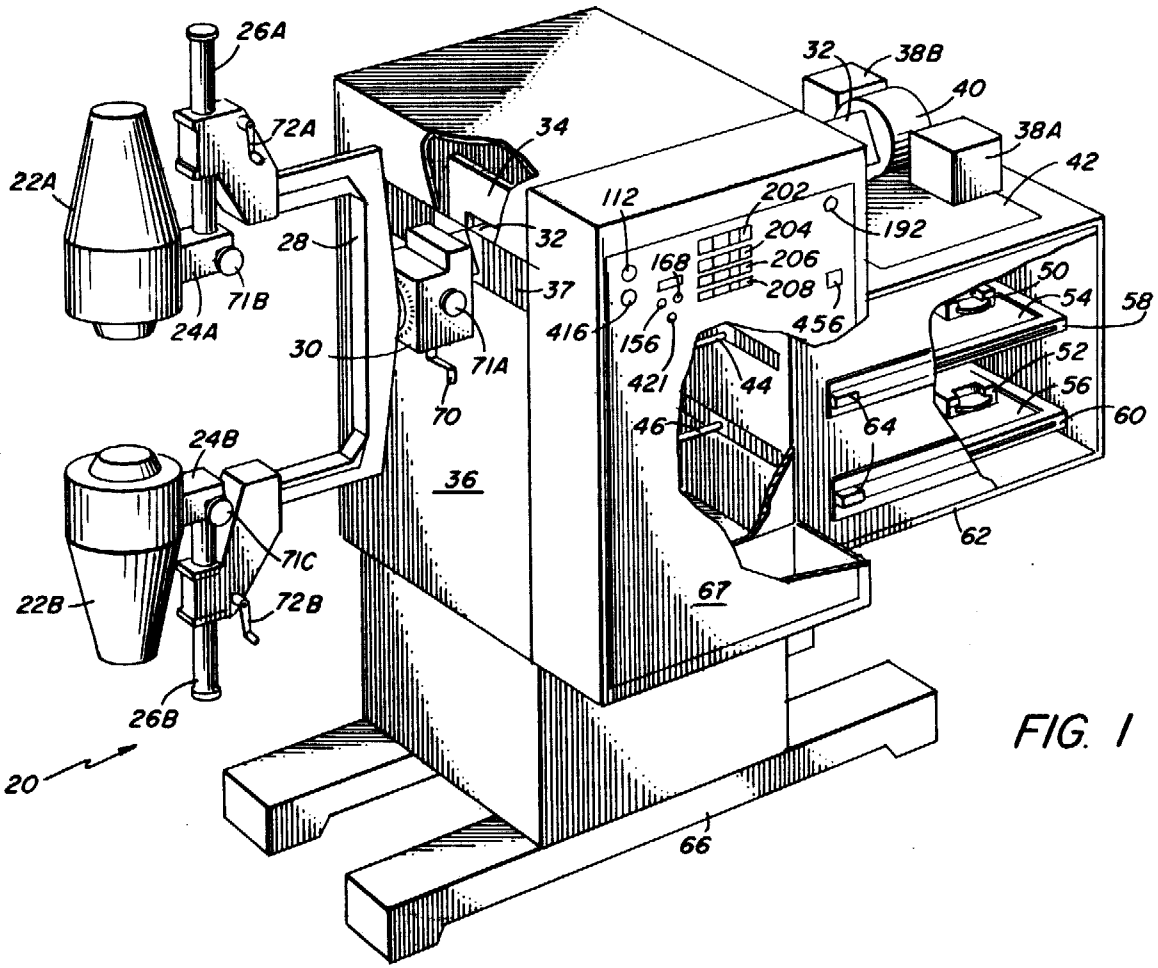
FIG. 1 is a pictorial representation, partially cut away to shown the drive mechanism, of the imaging system of the invention.

Referring now to FIG. 1 there is shown an imaging system 20 in accordance with the invention comprising a pair of scanning heads 22A and 22B which are pivotedly mounted by pivots 24A and 24B to a corresponding pair of rachet arms 26A and 26B which are slidably mounted within a C-frame 28. The C-frame 28 is pivotedly mounted by pivot 30 to a transport beam 32 which is supported within a carriage 34, partially shown in FIG. 1, for translational motion in a direction parallel to the axis of the carrier beam 32, hereinafter referred to as the X direction, and in a direction perpendicular to the transport beam 32, hereinafter referred to as the Y direction. The carriage 34 is mounted within a housing 36 in a manner to be described with reference to FIG. 8. The transport beam 32 enters the housing 36 via curtain 37. Writing heads 38A and 38B are affixed to the opposite end of the carrier beam 32 by means of a backlash linkage 40 which permits printing of a radiographic display upon a paper copy 42 while precluding the presence of the well known scalloping affect. In addition, two photographic copies of radiographs are formed by means of a pair of push rods 44 and 46 connected to the carrier beam 32 by means shown in FIG. 8 for driving a corresponding pair of photoheads 50 and 52 over film plates 54 and 56. The film plate 54 and 56 are contained within light-tight boxes or cassettes 58 and 60 positioned within a housing 62. The cassettes 58 and 60 are secured in a novel manner by locks 64 which prevent accidental exposure of the film plates 54 and 56. The housing 62 and the housing 36 are supported by means of a frame 66 which facilitates location of the imaging system within a room such as the room of a hospital. The housing 36 has a hinged section 67 to expose electronic equipment (not shown) located therein.

Referring now to FIGS. 2A, 2B and 2C there are shown three methods by which a patient 68 may be examined to produce a radiographic image. A source of radiation is provided by a radio pharmaceutical which may be ingested by the patient 68 and which then migrates through the body of the patient 68 to accumulate in the organ of the body which is to be observed. In FIGS. 2A and 2B the C-frame 28 has been rotated about pivot 30 with the aid of crank 70 (seen in FIG. 1) to a horizontal position and tightened by knob 71A of FIG. 1. The two scanning heads 22A and 22B have been rotated to parallel positions in FIG. 2A by means of the pivots 24A and 24B as seen in FIG. 1 and tightened by knobs 71B and 71C. The scanning heads 22A and 22B have been spaced apart a predetermined distance by means of the rachet arms 26A and 26B which are driven respectively by rachet cranks 72A and 72B of FIG. 1. With the arrangement of FIG. 2A two separate radiographic images can be provided as by use of film plate 54 and film plate 56 of FIG. 1 which taken together provide a complete image of the chest of the patient 68 which has absorbed the ratio pharmaceutical. In this manner a radiographic image can be obtained in half the time normally required, thereby permitting a hospital to process an increased number of patients with a single imaging system.

In FIG. 2B the scanning heads 22A and 22B are arranged by means as described with reference to FIG. 2A in a manner permitting a tomographic radiographic display in which the rays of radiation emanating from an organ 74 such as a thyroid gland are observed from two directions as is indicated by the angular orientation of the two scanning heads 22A and 22B relative to each other. In the situation of FIG. 22B as in the case of FIG. 2A the C-frame 28 has been orientated in a horizontal position by means of the crank 70 and the rachet arms 26A and 26B have been positioned by means of rachet drive gears 72A and 72B to provide the desired position of the scanning heads 22A and 22B relative to each other.

In FIG. 2C the C-frame has been positioned in a vertical position and the scanning heads 22A and 22B have been pivoted about pivots 24A and 24B to face each other in an antiparallel orientation such that the rays of radiation emanating from the head of the patient 68 in a vertical direction are intercepted by the scanning rays 22A while the rays of radiation emanating in the opposite direction are intercepted by scanning head 22B. In this way radiographic images of information obtained from the right side as well as the left side of the patient 68 can be obtained.

Figure 3:
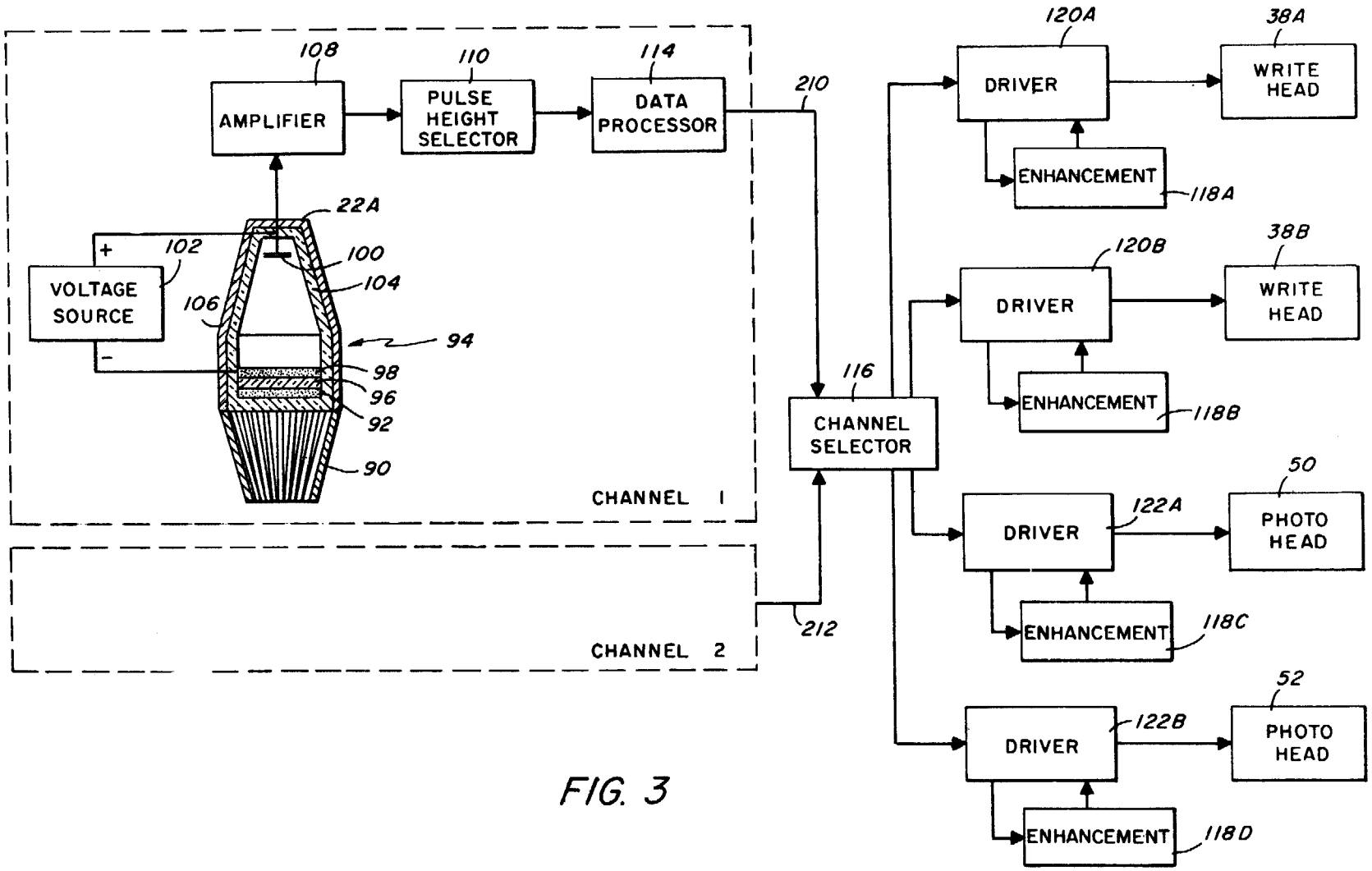
FIG. 3 is a block diagram showing the operation of the imaging system.

Referring now to FIG. 3 there is shown a block diagram of the imaging system 20. Two sources of data are provided by the scanning heads 22A and 22B of FIG. 1, and the data is processed respectively by channel 1 and channel 2 as shown in FIG. 3. The scanning heads such as scanning head 22A has the well known form comprising a collimator 90, a scintillator 92 and a photomultiplier 94 which is separated from the scintillator by a glass plate 96. The photomultiplier 94 comprises a photocathode 98 and an anode 100 which are maintained at a difference of potential of typically 1,000 volts by means of voltage source 102. A glass envelope 104 encloses the scintillator 92 as well as the photomultiplier 94 and is further surrounded by a lead shield 106 for capturing stray rays of radiation. Thus, the scanning head 22A is responsive to X-radiation, gamma radiation and radiaton of nuclear particles.

A quanta of radiation, such as a gamma ray emitted from the organ 74 in the patient 68 of FIG. 2B, passing through the collimator 90 and impinging on the scintillator 92 causes optical photons to be emitted from the scintillator 92. The optical photons are intercepted by the photocathode 98 thereby emitting photoelectrons which are accelerated across the difference of potential to the anode 100 which results in an electrical signal to which amplifier 108 is responsive.

The amplifier 108 provides a pulse signal corresponding to each quanta of radiant energy received by the scanning head 22A. Some of these quanta of energy are due to background radiation and are of a lower energy content than the quanta of energy, such as a gamma ray photon, emitted from the organ 74 of FIG. 2B. Accordingly, a pulse height selector 110, frequently referred to as a window, is utilized to pass those pulse signals from amplifier 108 having an amplitude indicating the presence of a quantum of energy emitted directly from the organ 74. The pulse height selector 110 is preset for the anticipated level of radiation associated with the radio pharmaceutical administered to the patient 68 by means of a plug-in module, hereinafter referred to as an isotope plug 112, positioned on the housing 36 in FIG. 1 and described in further detail with reference to FIG. 4.

The pulse signals provided by pulse height selector 110 are of uniform amplitude suitable for processing by digital equipment such as the data processor 114 which will be described in further detail with reference to FIG. 5. The data processor 114 weighs the data provided by the successive signal pulses from the pulse height selector 110 and provides an output signal waveform which is suitable for operating the writing heads 38A-B and the photoheads 50 and 52. Channel 2 comprises scanning head 22B (not shown in FIG. 3) and an amplifier and data processor corresponding to the amplifier 108 and data processor 114 of channel 1. A selection and a combination of the data of channel 1 and channel 2 are provided by a channel selector 116 which is described in further detail with reference to FIG. 6. For example, by means of the channel selector 116 the sum or the difference of the data of channel 1 and channel 2 may be provided to the writing heads 38A-B, or as a further example, the data of channel 1 may be provided to operate the photohead 50 while the data of channel 2 is provided to operate the photohead 52 to provide simultaneously on film plate 54 and film plate 56 of FIG. 1 radiographs corresponding to the radiation incident upon the scanning heads 22A and 22B. The writing heads 38A-B provide either a black and white display or alternativey a multicolor display, while the photoheads 50 and 52 provide a photographic image of varying gray scale in response to the radiation incident upon the scanning heads 22A and 22B. The responsivity of the color selection in the case of the writing heads 38A-B and the gray scale in the case of the photoheads 50 and 52 to the data provided by the channel selector 116 may be varied in a novel manner by means of a predetermined functional relationship which is preset by data enhancement circuits 118A-D in the form of plug-in modules on the housing 36 as will be described with reference to FIG. 7. As shown in FIG. 3, the data enhancement circuits 118A-D connect respectively with writing head drivers 120A and 120B and with photohead drivers 122A and 122B, described respectively in FIGS. 12 and 13, to provide radiographs in which the data is more readily interpreted.

Figure 4:
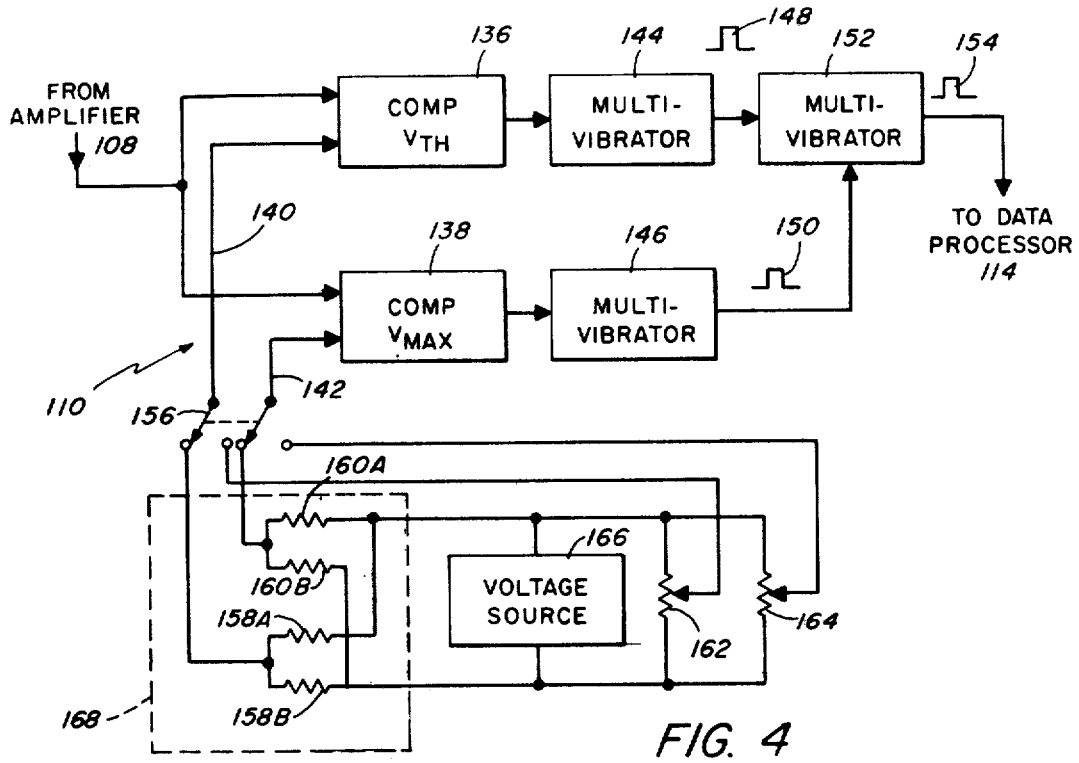
FIGS. 4 and 4A are a block diagram and a timing diagram and a timing diagram of a pulse height selector.
Figure 4A:
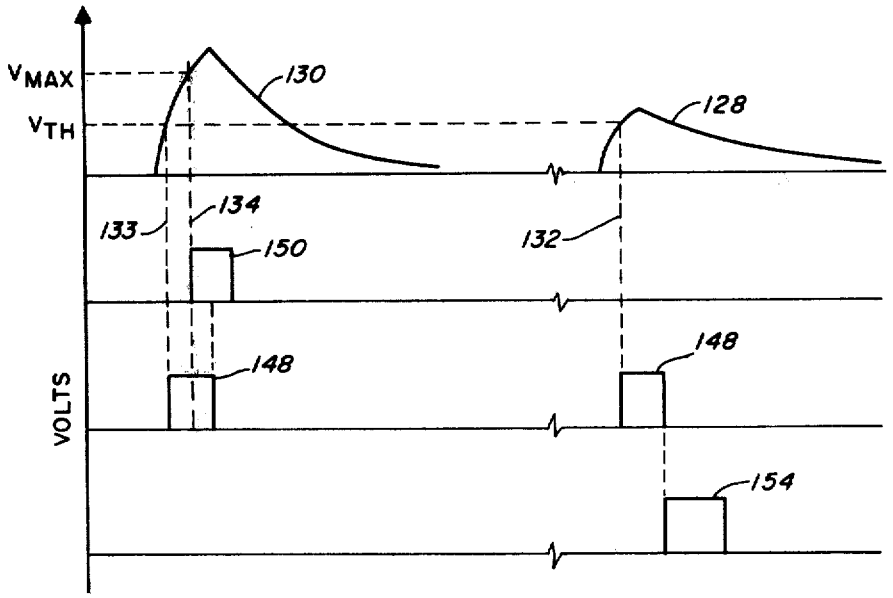

Referring now to FIGS. 4 and 4A there are shown respectively a block diagram of the pulse light selector 110 and a timing diagram useful in explaining its operation. The pulse height selector 110 is responsive to signals from the amplifier 108, such signals being shown illustrativey in FIG. 4A by pulses 128 and 130. The two pulses 128 and 130 are shown with their rise times exaggerated for purposes of illustration. The intersection of pulse 128 with line 132 and the intersection of pulse 130 with line 133 are at the minimum window voltage or threshold (shown as $V_{th}$ in the figure) which is regarded as an acceptable input signal. Thus, pulses provided by amplifier 108 having a peak value which is less than this threshold value are presumed to occur in response to an excessively low value of radiation incident upon the scanning head 22A such as might occur from Compton scattering in the vicinity of the organ 74 of FIG. 2B. The intersection of pulse 130 and the line 134 is at a maximum value of window voltage, $V_{max}$, of an acceptable input signal. Thus, as exemplified by pulse 130, the pulse 130 would be an unacceptable input signal in that it exceeds this maximum voltage and is presumed to be produced in response to an excessively high value of radiation incident upon the scanning head 22A of FIG. 3 such as might be caused by an extra terrestrial gamma ray. The pulse 128 of FIG. 4A represents an acceptable pulse in that its peak amplitude is greater than the threshold voltage yet less than the maximum voltage.

The pulse height selector 110 comprises a pair of comparators 136 and 138 which compare signals from amplifier 108 with respectively the threshold window voltage and the maximum window voltage, and provide output pulse signals (not shown) having leading and trailing edges respectively occurring when an input pulse such as pulse 130 crosses the threshold and the maximum window voltage values. Reference voltages representing the threshold window voltage and the maximum window voltage are provided respectively along lines 140 and 142.

The comparators 136 and 138 drive respectively monostable or "one shot" multivibrators 144 and 146 to provide pulses 148 and 150. The leading edges of pulses 148 and 150 correspond respectively to the time instants when the pulse 130 crosses the threshold window voltage and maximum window voltage. The pulse 148 has a duration of sufficient length such that the trailing edge of pulse 148 occurs approximately at the midpoint of pulse 150.

Multivibrator 152 is a monostable or "one shot" multivibrator which is triggered by the trailing edge of pulse 148 to produce an output pulse 154 and is inhibited by pulse 150 such that when pulse 150 is applied to the multivibrator 152 the output pulse 154 does not appear. When the pulse 150 is present, it is applied to the multivibrator 152 prior to the occurrence of the trailing edge of pulse 148 and is, therefore, effective to inhibit the multivibrator 152. Thus, when an input signal pulse such as pulse 128 is present an output pulse 154 is produced, however, when an input signal such as pulse 130 is present the multivibrator 152 is inhibited so that the pulse 154 is not produced. Also, in the event that an input signal of peak value less than the threshold window voltage is present, than none of the pulses 148, 150 and 154 is produced. In this way the pulse height selector 110 selects those input signal pulses having peak voltage values falling within the range of values bounded by the threshold and maximum window voltages, and provides output pulses 154 of uniform amplitude and duration corresponding to each one of the input pulse signals having an acceptable voltage value.

The reference voltages applied along lines 140 and 142 are obtained via switch 156 from resistors 158A, 158B, 160A and 160B which form a pair of voltage divider circuits, or alternatively, from potentiometers 162 and 164. The voltage divider circuit of resistors 158A and 158B, the voltage divider circuit of resistors 160A and 160B, and the potentiometers 162 and 164 are energized from voltage source 166 so that either the voltage divider circuits or the potentiometers may be utilized to provide the reference voltages along lines 140 and 142. The switch 156 is mounted on the housing 36 of FIG. 1. A novel plug in module hereinafter referred to as an isotope plug 168, comprises the resistors 158A, 158B, 160A and 160B, and is conveniently mounted on the housing 36 of FIG. 1 for operation of the imaging system 20 with the appropriate values of window voltages for the pulse height selector 110.

Figure 5:
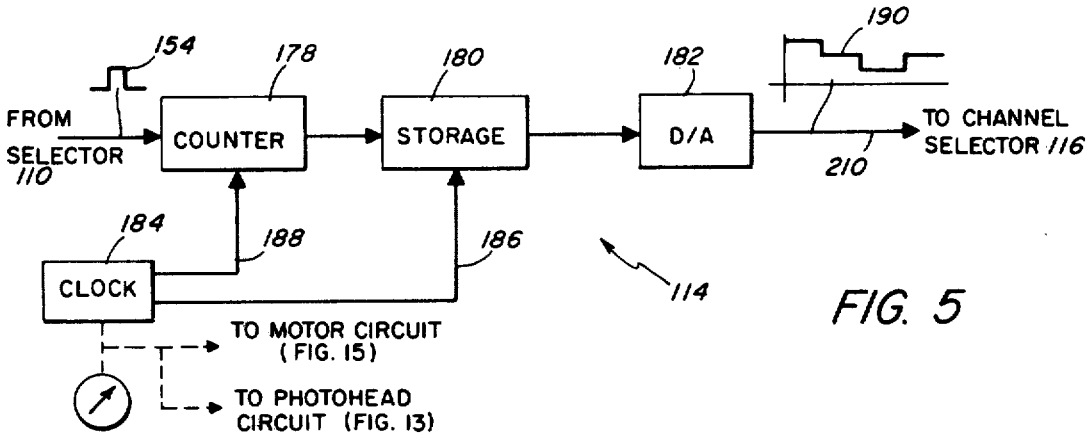
FIG. 5 is a block diagram of digital data processing equipment.

Referring now to FIG. 5 there is shown a block diagram of the data processor 114 which comprises a counter 178, a storage unit 180, a digital-to-analog converter 182 and a clock 184. Counter 178 is a digital counter responsive to successive pulses such as the pulse 154 from the pulse height selector 110 for counting these pulses and providing a digital number indicating such count. The storage unit 180 has the well known form of a group of flip-flops in parallel connection with each of the output bits of the counter 178. A strobe pulse provided by clock 184 along line 186 initiates the transfer of the digital number from the counter 178 to the storage unit 180. Immediately after the strobe pulse on line 186, a reset pulse is provided by clock 184 along line 188 to reset the counter 178 to zero. The digital number in the storage unit 180 is continuously applied to the digital-to-analog converter 182 which provides an output voltage having a magnitude proportional to the digital number stored in the storage unit 180. The analog output of the digital-to-analog converter 182 corresponding to successive changes in the digital number stored in the storage unit 180 is shown illustratively by the voltage waveform 190. The pulse repetition frequency of both the strobe pulse on line 186 and the reset pulse on line 188 provided by clock 184 is set by the scanning speed control knob 192 connected to the clock 184 and located on the housing 36 of FIG. 1. The scanning speed control knob 192 is also connected to the motor circuit of FIG. 15.

In operation, therefore, the data processor 114 is responsive to a sequence of individual pulses 154 from the pulse height selector 110 to provide an analog voltage output, such as the voltage waveform 190, in which the voltage amplitude corresponds to the number of pulses 154 occurring within the interval between successive reset pulses on line 188. Accordingly, the data processor 114 functions as an integrator in which the voltage waveform 190 is updated periodically at the frequency of the strobe and reset pulses on lines 186 and 188. As will become apparent in the description with reference to FIGS. 8 and 15, the speed at which the scanning head 22A is moved for scanning is proportional to the frequency of the clock 184, or equivalently the frequency of the strobe and the reset pulses on lines 186 and 188, due to the fact that the motor circuit of FIG. 15 and the clock 184 are both connected to the scanning speed control knob 192. Thus, the count accumulated in an interval between successive reset pulses on line 188 may equally well be regarded as the count accumulated over an interval of scanning in the X direction, such interval being, for example, 4 millimeters.

Figure 6:
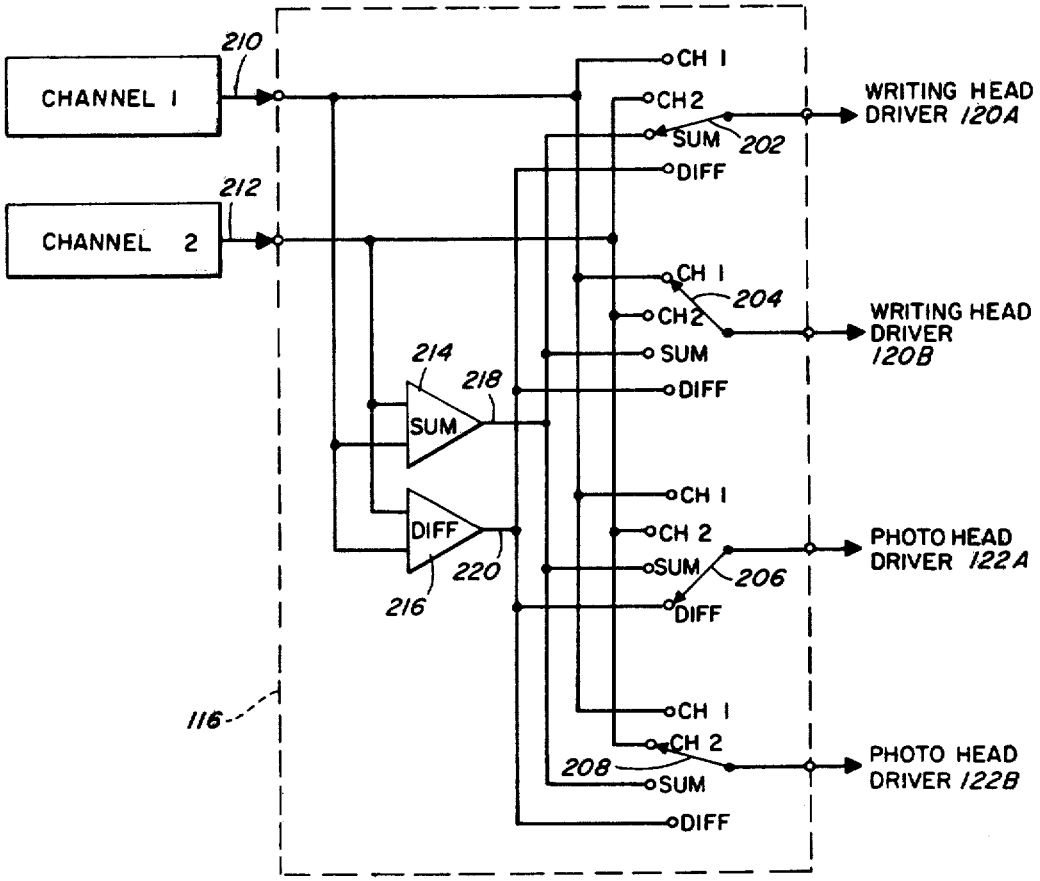
FIG. 6 is a block diagram of channel selection circuitry.

Referring now to FIG. 6 there is shown a schematic diagram of the channel selector 116 which accepts input signals from channel 1 and channel 2 and independently switches the signals by means of switches 202, 204, 206 and 208 to writing head drivers 120A and 120B and photohead drivers 122A and 122B of FIG. 3. The input signal from channel 1 on line 210 is provided by the data processor 114 of FIG. 3, and a corresponding signal from channel 2 on line 212 is provided by the data processor of channel 2. A summing amplifier 214 and a difference amplifier 216 provide the sum and difference of the signals on lines 210 and 212 such that the sum signal appears on line 218 at the output of summing amplifier 214 and the difference signal appears on line 220 at the output of the difference amplifier 216. The lines 218 and 220 connect with the four switches 202, 204, 206 and 208 so that the sum and difference signals may also be individually switched to the writing head drivers 120A and 120B and also to the photohead drivers 122A and 122B. The four switches 202, 204, 206 and 208 are conveniently mounted on the housing 36 to facilitate the selection of the appropriate data to be displayed on the paper copy 42 and the film plate 54 and 56 of FIG. 1.

Referring now to FIG. 7 there is shown an interior view of the writing head 38A. Writing head 38B has the same form as writing head 38A and is not shown in FIG. 7. A mark or imprint is made upon the paper copy 42, seen also in FIG. 1, by means of a tapered rod, preferably of steel, hereinafter referred to as a tapper 230. The taper 230 is affixed at its upper end to magnetic material not shown in the drawing which is enclosed by a solenoid 232 so that upon energization of the solenoid with an electric current provided by the writing head driver 120A of FIG. 12 along wires 234, the tapper 230 is drawn downwards toward the paper copy 42. A spring 236 affixed concentrically to the tapper 230 and also mounted to the underside of the solenoid 232 withdraws the tapper 230 from the paper copy 42 upon deenergization of the solenoid 232. The solenoid 232 and the tapper 230 are supported by a bracket 238 which in turn connects with a frame member 239 of the backlash linkage 40 which is seen also in FIGS. 8 and 9.

To provide a black and white radiograph, the paper copy 42 comprises preferably a pressure sensitive paper which when struck by the tapper 230 produces a black mark at the point of impact. The shape of the mark depends on the shape of the tip of the tapper 230 so that a dot or an elongated mark may be provided by an appropriate selection of the tip of the tapper 230.

To provide a multicolor radiograph, a multicolored ink ribbon 240 is wound around two spools 242A and 242B, positioned on plate 244 and rotated in a well known manner by a small motor (not shown) and is guided by struts 246, 247 and 248 across the tip of the tapper 230. Upon energization of the solenoid 232, the tapper strikes against a portion of the ribbon 240 and thereby imparts a mark of colored ink to the paper copy 42, the color of the ink depending on the strip, such as a strip 250 containing blue ink, struck by the tapper 230. The struts 246, 247 and 248 are mounted to the plate 244 which is pivotally mounted about the frame member 239 by means of fingers 252 extending from the plate 244. A potentiometer 253 is mounted to the frame member 239 such that its shaft, not shown, connects with a finger 252 with the shaft axs coincident to the pivot axis of the finger 252. The potentiometer 253 provides an electrical signal, to be described with reference to FIG. 12, which is responsive to the angle of pivot, or accordingly, the color of the mark imprinted on the paper copy 42. The struts 246 and 247 have surfaces which are lower, respectively, outwardly and inwardly along the centers of their axis to provide a uniform spacing of the ribbon 240 relative to the tapper 230 independently of the pivoting of plate 244. Pivoting of the plate 244 is provided by a sector gear 254 affixed to the top of the plate 250, and a worm gear 255 meshing with the sector gear 254 and driven by a stepping motor 256. In response to electrical signals energizing the stepping motor 256, as will be described with reference to FIG. 12, the stepping motor 256 imparts a rotation to the worm gear 255 to pivot the plate 244 for positioning the ribbon 240 beneath the tapper 230.

Figure 8:
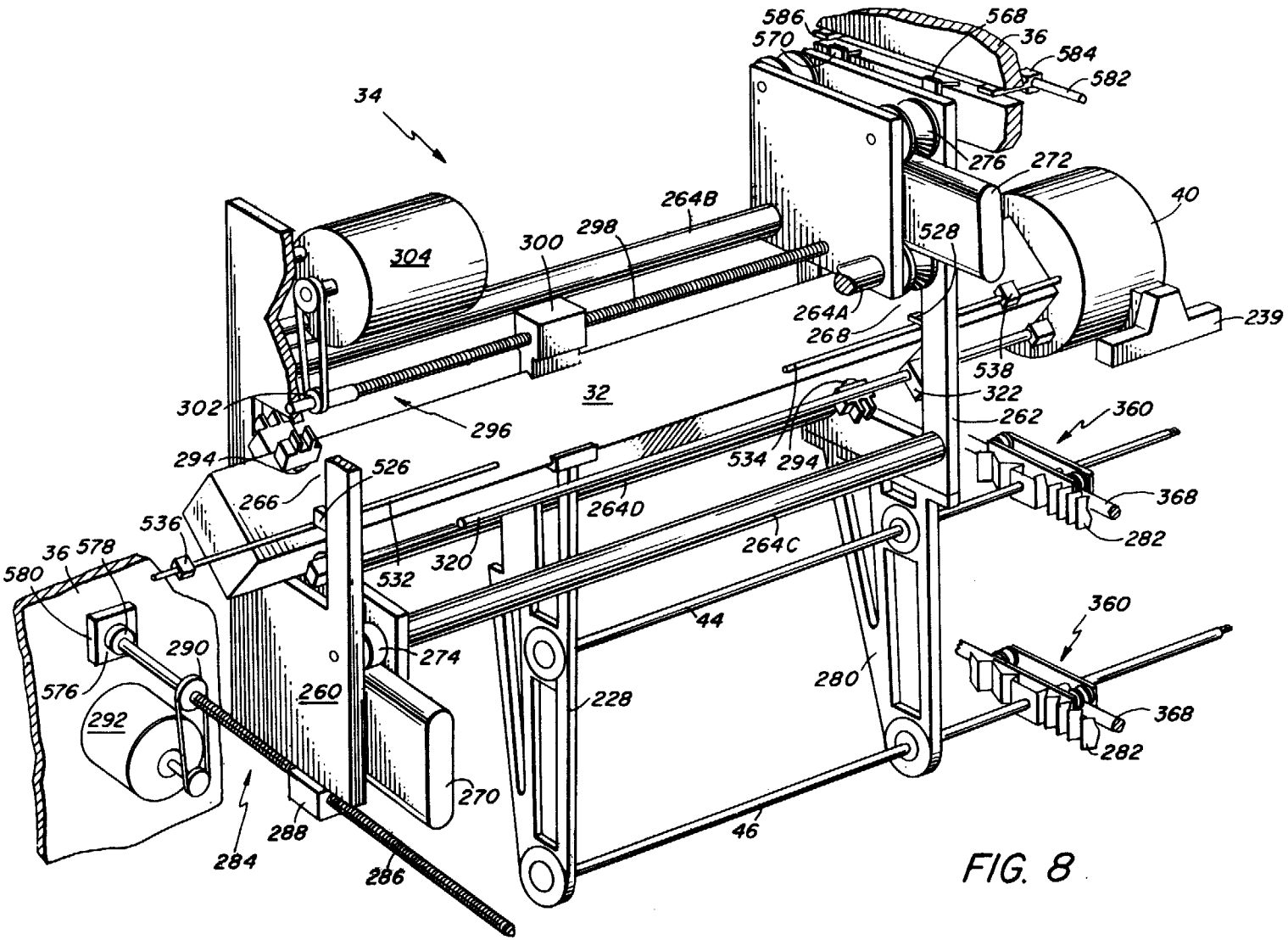
FIG. 8 is an isometric view of the drive mechanism which imparts a scanning motion to the scanning heads.

Referring now to FIG. 8 there is shown an isometric view of the carriage 34 and push rods 44 and 46 partially seen in FIG. 1. The carriage 34 comprises front plate 260, back plate 262, and four connecting struts 246A–D. The transport beam 32 passes through an aperture 266 in the front plate 260 and an aperture 268 in the back plate 262. The carriage 34 is mounted on rails 270 and 272 for motion in the Y direction by means of rollers 274 having a flat surface and contacting rail 270 and by means of rollers 276 having a concave surface and making contact with rail 272. The concavity of the rollers 276 aids in positioning the carriage 34 upon the rails 270 and 272. The push rods 44 and 46 are mechanically connected to the transport beam 32 by means of a rigid member referred to as hanger 278 which is rigidly affixed to the transport beam 32. The push rods 44 and 46 are also slidably mounted within a bracket 280 rigidly affixed to the back plate 262 for guiding the push rods 44 and 46 through curtains 282 for positioning the photoheads 50 and 52 seen in FIG. 1. The curtains 282 prevent the entry of light into the cassettes 58 and 60 of FIG. 1 as the carriage 34 moves back and forth during the scanning operation.

The carriage 34 is positioned in the X direction by means of a worm drive 284 which comprises worm gear 286, traveler 288 affixed to the front plate 160 and a chain drive 290 through which the worm gear 286 is driven by motor 292. Upon energization of the motor 292, as will be described with reference to FIG. 13, the carriage 34 is displaced along the X direction, the amount of displacement depending upon the amount of rotation of the worm gear 286.

The transport beam 32 is supported by the carriage 34 with the aid of rollers 294 mounted on both the front plate 260 and the back plate 262 around the apertures 266 and 268 in contact with each of the four sides of the transport beam 32. The rollers 294 permit movement of the transport beam 32 in the Y direction while the transport beam 32 is displaced in the X direction by movement of the carriage 34 in response to the worm drive 284.

The transport beam 32 is displaced in the Y direction by means of a worm drive 296 which comprises a worm gear 298, a traveler 300 rigidly affixed to the transport beam 32 and a chain drive 302 through which the worm gear 298 is driven by motor 304. In response to an exertation of motor 304 as will be described with reference to FIG. 15 the transport beam 32 is moved back and forth in the Y direction independently of its displacement in the X direction. In this way the transport beam 32 receives both X and Y displacements independently of each other to effect a scanning motion of the scanning heads 22A and 22B as well as a scanning motion of the backlash linkage 40, writing heads 38A and 38B and the push rods 44 and 46, all of which are seen in FIG. 1. It is noted that the scanning motion of the writing heads 38A and 38B is identical to that of the scanning heads 22A and 22B with the exception of the slight displacement of the scanning heads 38A and 38B afforded by the backlash linkage 40 for elimination of scalloping as will be described with reference to FIGS. 9 and 10. The use of a single mechanical connection, namely the transport beam 32 provides a precise correlation between the position of the writing heads 38A and 38B and the position of the scanning heads 22A and 22B.

Figure 9:
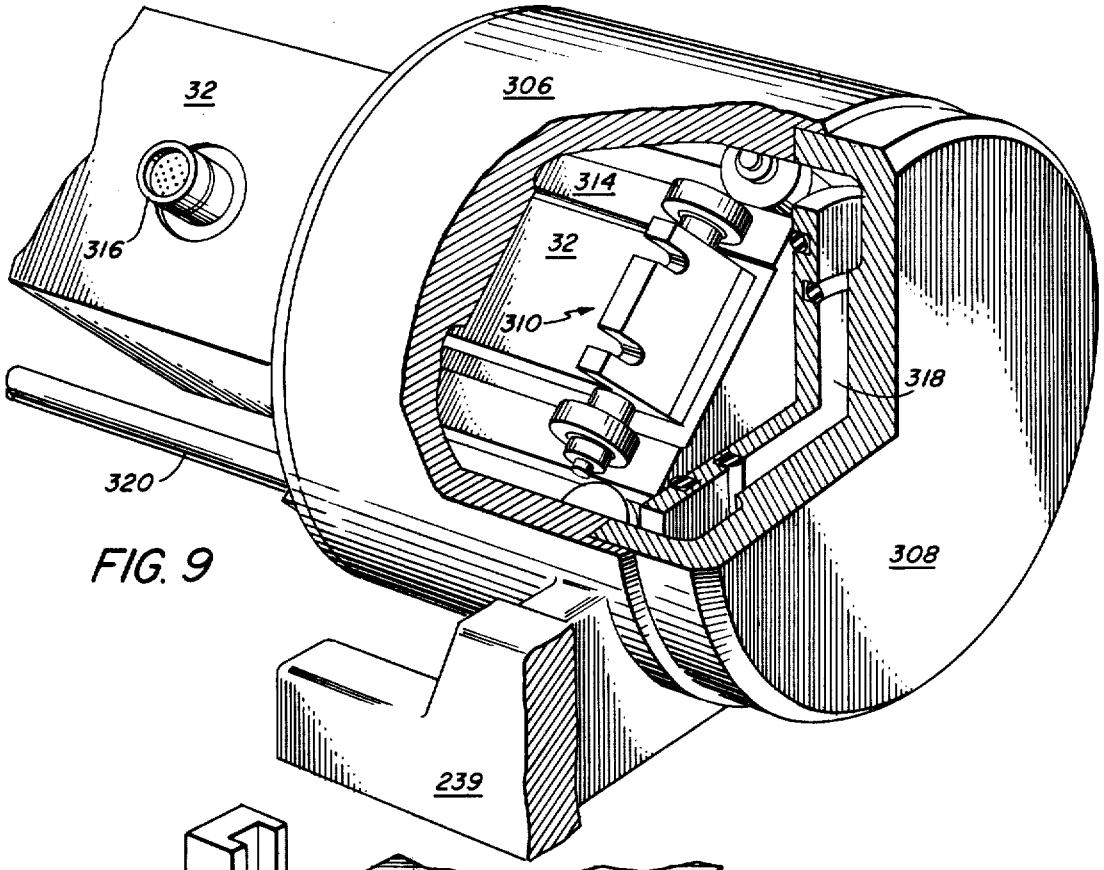
FIGS. 9 and 10 are isometric and diagrammatic views of an antiscalloping feature of the invention.
Figure 10:
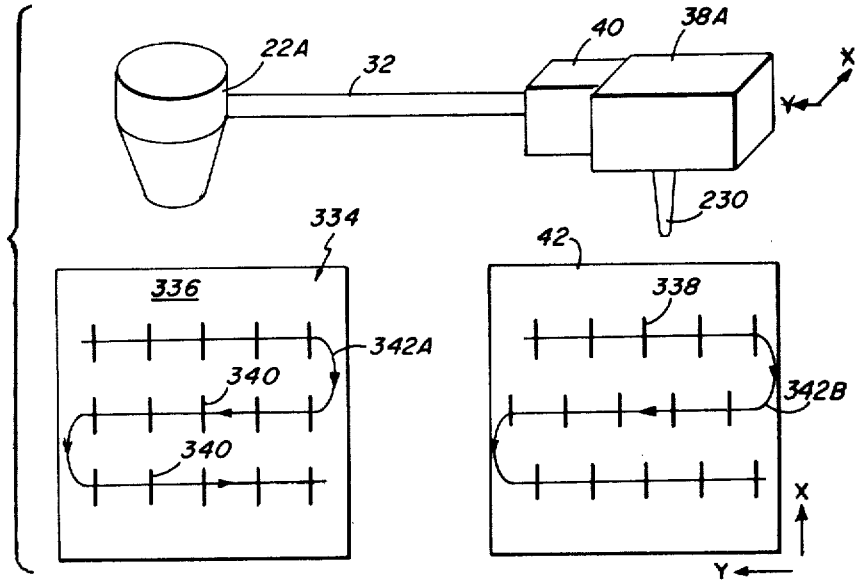

Referring now to FIGS. 9 and 10 there are shown respectively a cut-away view of the backlash linkage 40 and a diagrammatic view of a radiograph explaining the scalloping mechanism. The backlash linkage 40 comprises a outer shell 306 and frame member 239 to which is affixed the writing heads 38A and 38B, the outer shell 306 being closed off by a cover plate 308. The outer shell 306 encloses an end of the transport beam 32 and is in mechanical contact therewith by means of roller assemblies 310 each of which has a pair of rollers which ride along a track 314 on the transport beam 32. The transport beam 32 is hollow to permit the carrying of electric wires within the transport beam for making connection between the scanning heads 22A and 22B and the writing heads 38A and 38B of FIG. 1, and accordingly, the outer shell 306 encloses only the end portion of the transport beam 32 to permit electrical wires to make entry into the interior of the transport beam as by means of connector 316.

The amount of backlash provided by the backlash linkage 40 is equal to the spacing between the cover 308 and a striker plate 318 mounted directly to the end of the transport beam 32. A drag rod 320 is affixed to the outer shell 306 and, as is shown in FIG. 8, the drag rod 320 extends along the beam 32 and passes through a fitting 322 affixed to the back plate 262 of the carriage 34. The fitting 322 makes fictional contact with the drag rod 320 to supply the drag force. Upon a reversal in the direction of travel of the transport beam 32, as for example, when the transport beam 32 has been moving in a direction towards the backlash linkage 40 and then reverses direction, the striker plate 318 moves away from the cover plate 308 until a spacing between the striker plate 318 and the cover plate 308 is equal to the amount of scalloping to be negated, for example, 6 millimeters. At this point the roller assemblies 310 reach the end of the respective tracks 314 and are contacted by the back side of the striker plate 318 whereupon the roller assemblies 310 and the outer shell 306 proceeds to move along the transport beam 32 in the direction of the scanning heads 22A and 22B. As a second example, the transport beam 32 again reverses direction to move towards the writing heads 38A and 38B in which case there is again an interval of time when the outer shell 306 is momentarily stationary as the transport beam 32 advances toward the writing head 38A and 38B. The outer shell 306 remains stationary until the striker plate 318 moves the distance of six millimeters whereupon it strikes the cover plate 308 at which time the outer shell 306 commences to move along in unison with the transport beam 32. The effect of the six millimeter backlash distance in counteracting a scalloping effect will become apparent in the description of the scalloping as will now be described with reference to FIG. 10.

Referring now to FIG. 10 there is shown a diagrammatic representation of a simplified view of the imaging system 20 which is shown comprising a scanning head 22A, the backlash linkage 40 and a writing head 38A with a tapper 230, the scaning head 22A being shown mechanically connected to the backlash linkage 40 by means of a rigid connection representing the transport beam 32. For simplicity the C-frame 28 and the rachet arm 26A of FIG. 1 have been deleted. The imaging system 20 is shown forming an image on the paper copy 42 in response to a test pattern 334 painted by way of example with radioactive paint on a film 336 which is positioned beneath the scanning head 22A. As the scanning head 22A moves in both the X and Y directions, the tapper 230 provides a series of image marks 338 which correspond to the paint marks 340 of the test pattern 334. The arrows 342A and 342B trace the direction of movement of the scanning heads 22A and the tapper 230. Assuming, for the moment, that the backlash linkage 40 has been disabled, it is observed that while the paint marks 340 of the test pattern 334 are arranged in regular rows and columns, the series of image marks 338 are also arranged in regular rows; however, the columns of the series of image marks 338 have an irregular shape corresponding to the well known scalloping effect. By way of example, the displacement of the image marks 338 from their true columnar positions is presumed to be 6 millimeters. The backlash linkage 40 is now presumed to be adjusted to provided 6 millimeters of backlash distance whereupon the scalloping effect disappears.

The scalloping effect may be explained as follows. Recalling the description of the data processor 114 with reference to FIG. 5, the data provided along line 210 seen also in FIG. 3 is updated at the repetition frequency of the reset pulse on line 188 from clock 184. Or, equivalently, the data on line 210 is updated once during each four millimeter scanning interval in the X direction. Now, with reference to FIG. 10, is readily appreciated that each of the image marks 338 may be delayed from its corresponding paint mark 340 by a distance of up to six millimeters. Thus, when the transport beam 32 reverses direction the first image mark 338 to be placed in the new row is offset by 6 millimeters, and similarly the remaining image points 338 in that row are offset by the 6 millimeter distance. The scalloping effect is cured with the aid of the backlash linkage 40 since on a reversal of direction of motion of the transport beam 32 the writing head 38A remains stationary until the scanning head 22A and the transport beam 32 have advanced 6 millimeters in the X direction whereupon the tapper 230 imprints an image mark 338 in the correct columnar position.

Referring now to FIG. 11 there is shown a detailed isometric view of the photohead 50 and a carriage 350 with portions of the figure shown in section. Photohead 52 is identical to photohead 50 and is, therefore, not shown in the figure. The photohead 50 is suspended from the carriage 350 by means of a bracket 352 affixed to a transport plate 354 which forms a part of the carriage 350. The carriage 350 further comprises a pair of support rods 356 and 358, by which the transport plate 354 is slidably supported in the X direction, a roller assembly 360 and a roller assembly 362 affixed to the ends of the support rods 356 and 358. Roller assemblies 360 and 362 comprise respectively concave surfaced rollers 364 and flat surfaced rollers 366 for supporting the carriage 350 on rails 368 and 370 to provide motion in the Y direction. The concave surfaces of the rollers 364 serve to position the carriage 350 on the rails 368 and 370.

The photohead 59 comprises an electronic flash lamp 372 which flashes in response to an electric signal from the photohead driver 122A transmitted along electrical conductors 374. A lens 376 supported in spaced relationship to the flash lamp 372 by support 378 focuses light from the flash lamp 372 upon film plate 54 within the cassette 58. An aperture plate 380 having a plurality of apertures, such as aperture 381, of differing shapes is positioned between the flash lamp 372 and the lens 376 to provide a desired shape to the spot of light impinging upon the film plte 54. An aperture is selected as follows. A motor 382 positioned within the support 378 rotates the aperture plate 380 about shaft 384 via a step down gear train 386 to position the desired aperture in front of the flash lamp 372. A plurality of microswitches 388 positioned on top of support 378 have arms 390 which engage cams 392 for actuation of an individual one of the microswitches 388 corresponding to a desired aperture for deenergizing the motor 382 when the desired aperture is in position.

The carriage 350 is positioned in the X direction by means of push rod 44, seen also in FIGS. 1 and 8, which engages the carriage 350 by means of a backlash linkage 394, the backlash linkage 394 being provided to counteract the scalloping effect described earlier with reference to FIGS. 9 and 10. The backlash linkage 394 comprises a striker 396 slidably mounted within the transport plate 354 and affixed to the push rod 44 which is slidably extended through end portions 398A and 398B of the transport plate 354. A small amount of friction is provided between the transport plate 354 and the support rod 356, as for example, by means of a spring assembly 400, indicated diagrammatically, which exerts a slight pressure upon the support rod 356. In operation, the push rod 44, in response to motion of the hanger 278, the transport beam 32 and the carriage 34 of FIG. 8, moves the carriage 350 in both the X and the Y direction in precise synchronism with the motion of the writing heads 38A and 38B of FIG. 1. Upon reversal of motion in the X direction by push rod 44, the transport plate 354 remains stationary momentarily until the striker 396 has advanced a distance sufficient to counteract the scalloping effect, as was explained with reference to FIGS. 9 and 10, whereupon the striker 396 strikes the transport plate 354 for resumption of motion of the transport plate 354. To facilitate movement of the carriage 350 in the X direction, the push rod 44 passes through the roller assembly 360, seen also in FIG. 8, and slidaly contacts the roller assembly 360 for urging it in the X direction.

Figure 12:
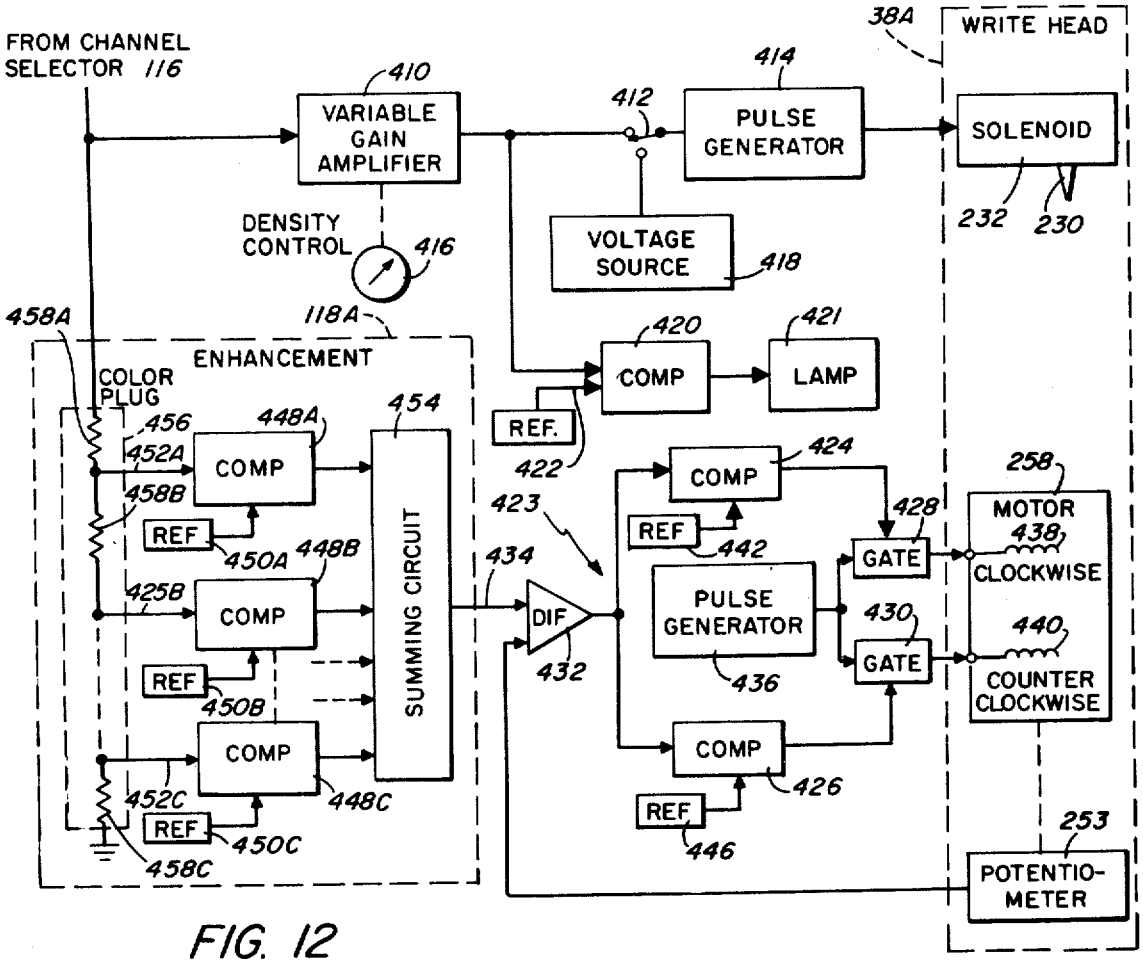
FIG. 12 is a block diagram of a drive circuit for a writing head.

Referring now to FIG. 12 there is shown a block diagram of the writing head driver 120A and the data enhancement circuit 118A which is interconnected with the writing head driver 120A. The writing head driver 120A accepts a signal from the channel selector 116 as shown in FIGS. 3 and 6, the input signal having an amplitude proportional to the number of photons counted in a predetermined interval as described earlier with reference to the description of the data processor 114 of FIG. 5. The input signal is applied via a variable gain amplifier 410 and switch 412 to a variable frequency pulse generator 414 which is responsive to the amplitude of the signal provided by the variable gain amplifier 410. The pulse generator 414 provides a sequence of electrical pulses for energizing the solenoid 232 of the writing head 38A, the sequence of electrical pulses occurring at a pulse repetition frequency linearly related to the amplitude of the signal provided by the variable gain amplifier 410. Thus, the solenoid 232 drives the tapper 230 of the writing head 38A with a repetition frequency, or tapping rate, linearly related to the amplitude of the signal from the channel selector 116. This linear relationship is dependent on the scaling factor of the variable gain amplifier 410 as is set by a knob 416 labled "density control" connecting with the variable gain amplifier 410 and located on the housing 36 of FIG. 1. The density control knob 416 is utilized to establish the spacing between contiguous marks on the paper copy 42 of FIG. 10.

In an alternative mode of operation the switch 412 is operated to connect the pulse generator 414 to a voltage source 418 which provides a constant input voltage to the pulse generator 414 so that the marks on the paper copy 42 of FIG. 10 are uniformly spaced; this mode of operation is frequently useful when data is presented in color on the paper copy 42.

An additional feature is provided by means of a comparator 420 and a lamp 421 which indicates when the tapping rate provided by the solenoid 232 becomes excessively high. The comparator 420 compares the output voltage of the variable gain amplifier 410 to a reference voltage on line 422 provided by a suitable source of voltage (not shown). When the output voltage of the variable gain amplifier 410 is greater than the reference voltage on line 422, thus indicating that the pulse repetition frequency of the pulse train provided by the pulse generator 414 exceeds the frequency response of the solenoid 232 and the tapper 230. The comparator 420 provides an output voltage which energizes the lamp 421, located on the housing 36, thereby providing an indication of the excessive tapper repetition frequency.

The stepping motor 256 which positions the ribbon 240 described earlier with reference to FIG. 7, is energized from the signal provided by the channel selector 116 via the color data enhancement circuit 118A and a color circuit 423 which comprises a pair of comparators 424 and 426, a pair of gates 428 and 430, and a feedback loop comprising the potentiometer 253 described with reference to FIG. 7 and a difference amplifier 432. The input signal is modifed by the data enhancement circuit 118A to provide an enhanced signal on line 434 in a manner to be described. The stepping motors 256 is energized in the following manner: to provide both clockwise and counterclockwise rotation. A pulse generator 436 provides pulses to the windings of the stepping motor 256. The stepping motor 256 has a pair of windings, indicated diagrammatically, for producing either clockwise or counterclockwise rotation, the clockwise winding 438 and the counterclockwise winding 440 being shown diagrammatically. The clockwise winding 438 is energized with pulses from the pulse generator 436 via the gate 428; and the counterclockwise winding 440 is energized with pulses from the pulse generator 436 by the gate 430. As described earlier with reference to FIG. 7, the voltage provided by the potentiometer 253 represents the position of the plate 250 and ribbon 240 as well as the color of the ink being utilized by the tapper 230. The desired color is represented by the value of the voltage of the enhanced signal on line 434. The difference amplifier 432 provides a signal representing the difference of these two voltages. When the signal provided by the difference amplifier 432 is greater than a reference 442 supplied by a suitable voltage source (not shown) and applied to the comparator 424, the comparator 424 provides a signal which enables the gate 428 thereby passing pulses from the pulse generator 436 to energize the clockwise winding 438. When the signals provided by the difference amplifier 432 has a value of voltage lower than the voltage of a reference 466 applied to the comparator 426, the comparator 426 provides a signal which enables the gate 430 thereby permitting pulses from the pulse generator 436 to energize the counterclockwise winding 440. And, when the value of the voltage of the signals provided by the difference amplifier 432 is less than the voltage of the reference 442 and greater than the voltage of the reference 446 then neither gate 428 or gate 430 is enabled and the stepping motor 256 is deenergized and is not rotating. Thus, the stepping motor 256 is able to provide the desired colors as requested by the enhanced signal on line 434 to provide a colored radiograph on the paper copy 42 of FIG. 1.

The data enhancement circuit 118A and the data enhancement circuit 118B, seen in FIG. 3, operate in the same fashion, and therefore, the data enhancement circuit 118B is not shown in FIG. 12. The data enhancement circuit 118A increases the responsivity of the color drive circuit 423 to a preselected range of colors while decreasing the responsivity of the color drive circuit 423 to other preselected colors. This is in contradistinction to the signal provided by the channel selector 116 which induces a uniform responsivity of the color drive circuit 423 to the various colors. The variation and responsivity occurs by virtue of the enhanced signal on line 434. For example, in the absence of the data enhancement circuit 118A there is a linear relationship between the color selected and the amplitude of the signal provided by the channel selector 116. Again, by way of example, it may be desirable to emphasize those areas of a radiograph corresponding to high intensity radiation which might be represented by warm colors such as red, orange and yellow. In this case, the voltage of the enhanced signal on line 434 would be of a relatively low value even when the voltage of the signal provided by the channel selector 116 has risen to a moderately high value, but as the voltage provided by the channel selector 116 rises to a higher value then the voltage of the enhanced signal on line 434 would be observed to rise sharply with the result that the colored radiograph provided on the paper copy 42 of FIG. 1 would have cooler colors such as green, blue, purple over most of the radiograph with the warmer colors, red, orange and yellow appearing only at those spots corresponding to high intensity radiation, thereby emphasizing these spots of high intensity radiation.

To data enhancement circuit 118A comprises a series of comparators of which three are shown in the drawing, the three comparators being designated 448A, 448B and 448C. Each of these comparators 448A–C are provided with separate reference signals having different values of voltages, three such reference signals being shown in the Figure designated at 450A–C. The comparators 448A–C provide output signals when their input signals on lines designated respectively by 452A–C are greater than the voltages of the respective reference signals 450A–C. The output signals of the comparators 448A–C. are summed together in a summing circuit 454 to provide the enhanced signal.

The desired enhancement characteristic is provided by a plug-in module hereinafter referred to as a color plug 456 which is located on the housing 36 of FIG. 1. The color plug 456 comprises a series of resistors 458A–C which function as a voltage divider of the voltage provided by the channel selector 116, the values of the various voltage obtained on the lines 452A–C depending on the values of the resistors reistors such as the resistors 458A–C. Thus, the use of the color plug 456 in combination with the comparators 448A–C and the summing circuit 454 provides the desired enhancement characteristic to the signal of the channel selector 116 thereby providing the desired responsivity of the color drive circuit 423 to the color command represented by the voltage value of the signal of the channel selector 116.

Figure 13:
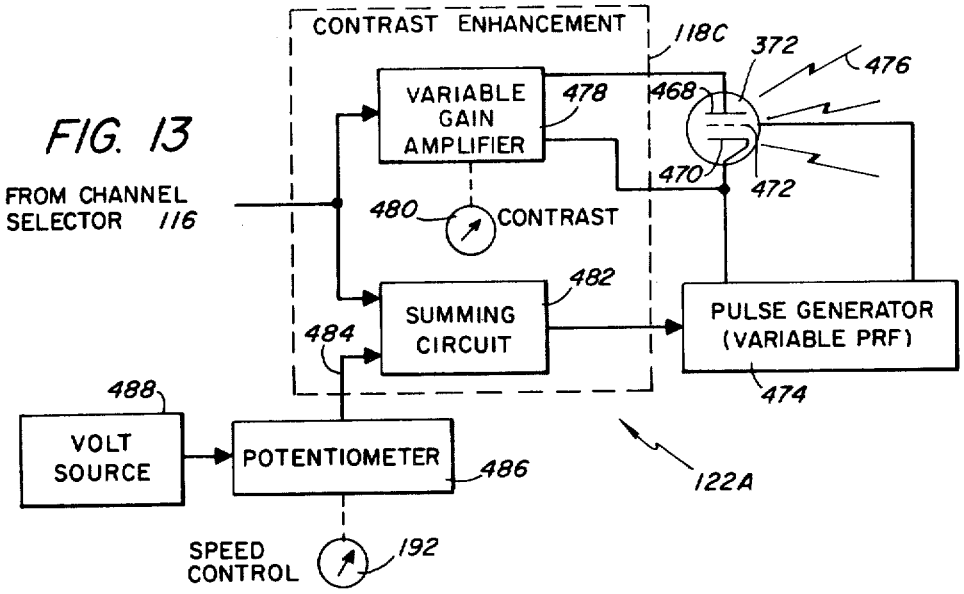
FIG. 13 is a block diagram of a drive circuit for a photohead.

Referring now to FIG. 13 there is shown a diagrammatic representation of the photohead driver 122A, seen in FIG. 3, which energizes the flash lamp 372 of FIG. 11. The circuit of the photohead driver 122B of FIG. 3 is the same as that of 122A and is, accordingly, not shown in FIG. 13. The flash tube 372 is of a well known form comprising an anode 468, a cathode 470 and a grid 472. A pulse generator 474 applies voltage pulses between the terminals of the grid 472 and the cathode 470 to gate the flash tube 372 ON and OFF. Light rays 476 are emitted when the flash tube 372 is gated on by the pulse generator 474. The intensity of the light rays 476 is dependent on the voltage impressed between the terminals of the anode 468 and the cathode 470 by means of a variable gain amplifier 478. The gain of the amplifier 478 is varied by means of a knob 480 located on the housing 36 of FIG. 1 and connecting with the variable gain amplifier 478.

The photohead driver 122A is responsive to the signal provided by the channel selector 116 via switch 206 as indicated in FIG. 6, in that the signal is applied to the variable gain amplifier 478 which acts as a scaling factor to provide a voltage for energizing a flash tube 372 which is linearly related to the amplitude of the voltage provided by the channel selector 116. The photohead driver 122A is furthermore responsive to the signal from the channel selector 116 in that the signal is applied to a summing circuit 482 and thereby combined with a second signal on line 484 to provide an output voltage which is applied to the pulse generator 474. The pulse repetition frequency of the pulse generator 474 is linearly related to the voltage provided by the summing circuit 482 so that an increase in the signal voltage provided by the channel selector 116 results in an increase in the pulse repetition frequency of the pulse generator 474 with a corresponding increase in the rate of flashing of the light rays 476 of the flash tube 372.

The photohead driver 122A is also responsive to the scanning speed of the transport beam 32 such that with increased scanning speeds the flashing repetition frequency of the flash lamp 372 is increased to provide an image density on the film plate 54 of FIG. 11 which is invariant with scanning speed. Since the flashing rate of the flash tube 372 is sufficiently great such that the light from the various flashes overlap on the film plate 54, as seen in FIG. 11, a varying of the flash rate with the scanning speed ensures an image density which is invariant with scanning speed. Accordingly, a potentiometer 486 energized by a voltage source 488 is operated by the speed control knob 192, described with reference to FIGS. 5 and 15, and generates the signal on line 484 for the summing circuit 482, thereby providing the desired responsivity of the photohead driver 122A to the scanning speed. The variable gain amplifier 478 and the summing circuit 482 constitute the data enhancement circuit 118C seen also in FIG. 3 and ensure that light flashes from the flash tube 372 have an intensity and a pulse repetition frequency dependent on the amplitude of the signal provided by the channel selector 116.

Figure 14:
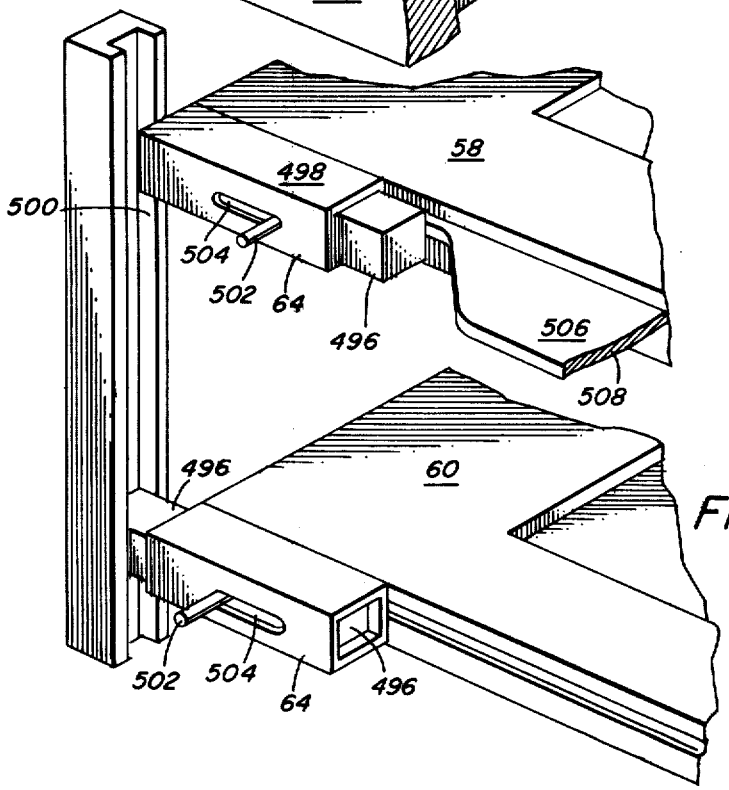
FIG. 14 is an isometric view of film cassettes showing a novel lock.

Referring now to FIG. 14 are shown the locks 64 for the cassettes 58 and 60 of FIG. 1. The locks 64 comprises a bolt 496 slidably mounted within a guide 498 for engaging channel 500 of the housing 62 seen in FIG. 1. Access to the bolt 496 in the form of a handle is provided by a pin 502 extending outwardly from the bolt 496 through a slot 504 in the guide 498. The bolt 496 is positioned by sliding the pin 502 in the slot 504. A slide 506 is provided in the cassette 58 and 60 for protecting the film plate such as the film plate 54 of FIG. 11 from light when the cassette is extracted from the housing 62. The width of the slide 506 is such that the edge of the slide clears the guide 498 of a cassette such as cassette 58 when the slide is removed from the cassette 58. However, when the bolt 496 extends beyond this end of the guide 498 is catches the edge of the slide 506 thereby preventing accidental removal of the slide 506. Thus, the lock 64 provides a novel arrangement wherein it secures the cassette 58 to the housing 62 of FIG. 1 or, alternatively, releases the cassette 58 from the housing 62 while engaging the slide 506. The front lip 508 of the slide 506 serves as a handle for extracting the cassette 58 from the housing 62.

Figure 15:
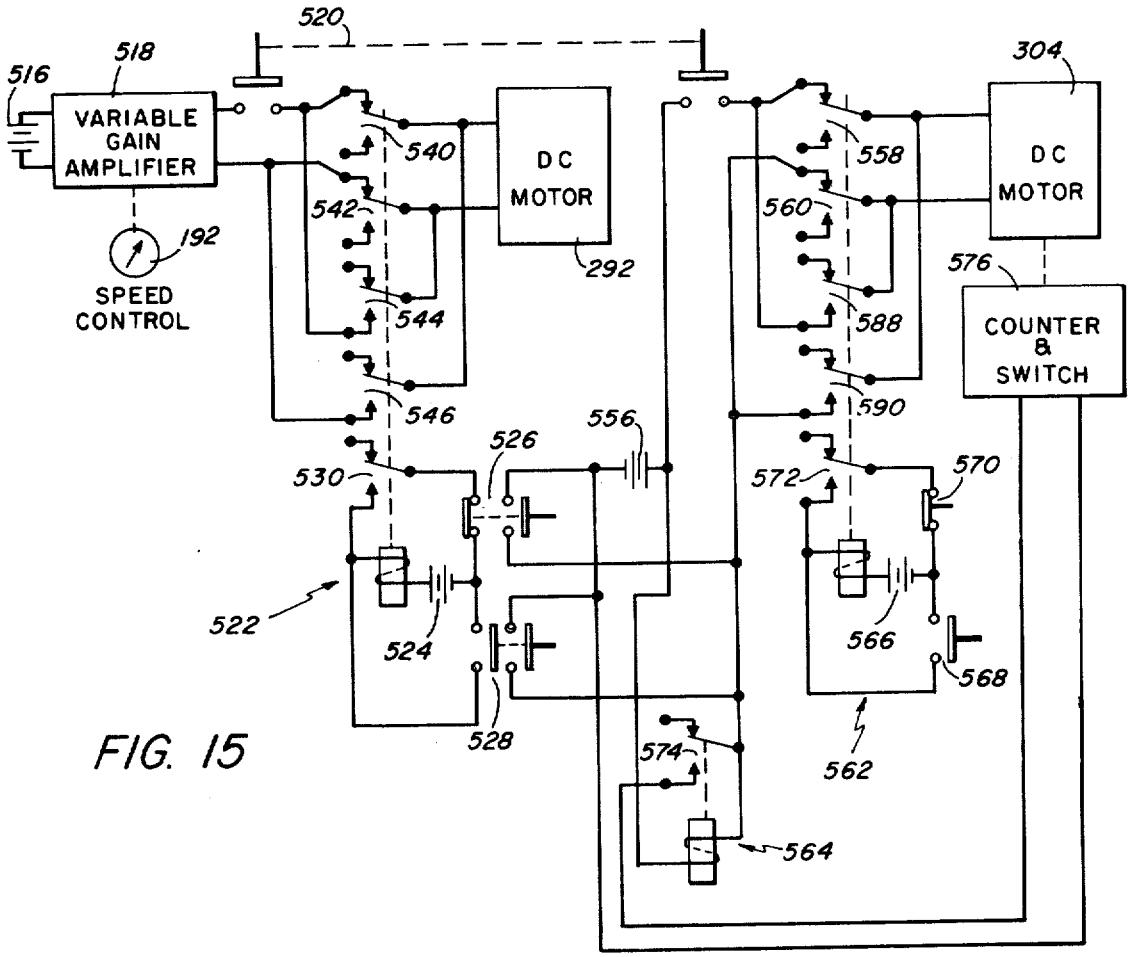
FIG. 15 is a schematic diagram of a control circuit for scanning motors of the imaging system.

Referring now to FIG. 15 there is shown a schematic diagram of the circuitry for energizing the motor 292 and 304 of FIG. 8 which provide respectively movement of the transport beam 32 in the X direction and movement of the carriage 34 in the Y direction. The motor 292 is energized from a source of power 516 (shown symbolically as a battery) supplied via a variable gain amplifier 518, a power-on switch 520 and a relay 522. The relay 522 is energized from a source of power 524 via microswitches 526 and 528 and a set of contacts 530 of the relay 522 itself.

Returning momentarily to FIG. 8 the microswitches 526 and 528 are seen located respectively on the front plate 260 and the back plate 262 of the carriage 34. The microswitches 526 and 528 are utilized to initiate and to terminate the movements of the transport beam 32 in the X direction. A pair of scales 532 and 534 are mounted on the transport beam 32. A pair of knobs 536 and 538 are slidably mounted respectively on the scales 532 and 534 for setting the extreme points of the scanning movement of the transport beam 32. The knob 536 serves as a cam for actuating the microswitch 526 when the knob 536 passes by the front plate 260. The knob 538 serves as a cam for actuating the microswitch 528 as the knob 538 passes by the back plate 262. Actuation of the microswitches 526 and 528 causes the motor 292 to reverse direction as is shown on FIG. 15.

Returning now to FIG. 15 the relay 522 is shown deenergized and the motor 292 is energized via the two sets of relay contacts 540 and 542. The motor 292 drives the transport beam 32 from the back plate 262 towards the front plate 260 in the manner described with reference to FIG. 8. This movement of the transport beam 32 continues until the knob 538 actuates the microswitch 528 on the back plate 262. As shown in FIG. 15 actuation of the microswitch 528 closes the circuit containing the source of power 524 thereby energizing the relay 522 with the result that the motor 292 is energized through another set of relay contacts 544 and 546 with the result that electric current enters the winding (not shown) of the motor 292 in the reverse direction thereby reversing the motor direction of rotation. The motor may have by way of example, a permanent magnet stator, and a rotor which is energized through a commutator by an external current such that reversal of this current, as in the case of the motor 292, results in a reversal of the direction of rotation. Energization of the relay 522 also closes the set of relay contacts 530 providing a second path of energization of the relay with power from the source of power 524 via the microswitch 526. The reversed direction of the motor 292 now drives the transport beam 32 of FIG. 8 from the front plate 260 towards the back plate 262 so that the knob 538 is no longer engaging the microswitch 528 with the result that the microswitch 528 opens one of the circuits energizing the relay 523. However, the relay 522 remains energized via the microswitch 526. The movement of the transport beam 32 continues until the knob 536 actuates the microswitch 526 on the front plate 260 thereby breaking the circuit for energizing the relay 522. Thus, the relay 522 becomes deenergized and assumes the contact position shown in FIG. 15. Accordingly, the motor 292 reverses direction such that the transport beam 32 is again traveling in a direction from the back plate 262 towards the front plate 260 thereby completing the cycle in the X direction.

The motor 304 is energized by a source of power 556 via the power-on switch 520, two sets of relay contacts 558 and 560 of relay 562, and by the parallel combination of microswitches 526 and 528 and the relay 564. The relay 562 is energized from a source of power 566 via a first circuit including microswitch 568 and a second circuit including microswitch 570 and a set of contacts 572 of the relay 562 itself. It is noted that the motor 304 remains deenergized until such time as either the microswitch 526 or microswitch 528 is actuated. Thus, during a scanning movement of the transport beam 32 the motor 304 is deenergized and the carriage 34 does not move in the Y direction. However, at the conclusion of a single scan in the X direction when the transport beam 32 reverses direction, the microswitch 526 of the microswitch 528 is actuated respectively by the knob 536 or the knob to effect the reversal of direction of the transport beam 32. At the movement of actuation of microswitch 526 or 528 the motor 304 is energized and the carriage 34 is displaced in the Y direction in the manner described with reference to FIG. 8. Energization of the motor 304 also results in an energization of the relay 564 with the consequent closing of its set of contacts 574. The closure of the contacts 574 in circuit with the counter-switch unit 576, seen also in FIG. 8, retains the state of energization of the motor 304 even after the microswitches 526 and 528 are no longer actuated by the knobs 536 and 538. Thus, the motor 304 is able to position the carrage 34 independently of the length of time that the carriage 526 and 528 are actuated.

The motor 304 is deenergized when the carriage 34 has been displaced or indexed by a preset amount, this amount being set by the counter-switch unit 576 which as shown in FIG. 8 is located on the end of worm drive 284 and mounted on the housing 36. The counter-switch unit 576 comprises a rotary member 578 directly connected to the worm gear 286, and a stationary member 580 connected to the housing 36. The counter-switch unit 576 counts the number of rotations of the worm gear 286 and opens its switch when the prescribed count has been reached. The counter-switch unit 576 is of a well known form and may comprise, for example, a rotary member 578 having a permanent magnet which actuates reed switches (not shown) in the stationary member 580, the reed switches being arranged in a counting circuit. Alternatively, the stationary member 580 may comprise a magnetic coil pickup which energizes a digital counter whenever the pickup coil is energized by the magnet of the rotary member 578. Upon reaching the desired count the counter-switch unit 576 opens its switch which deenergizes the relay 564 thereby deenergizing the motor 304 so that the carriage 34 remains stationary at its new position.

When the carriage 34 has reached an extreme position in the Y direction its motion must then be reversed to bring it back. The motor reversal circuit for the motor 304 is similar to that described earlier with reference to the motor 292. A scale 582, seen in FIG. 8, is mounted to the rear of the housing 36. Two knobs 584 and 586 are slidably mounted on the scale 582 for setting the extreme points of the indexing motion of the carriage 34. In one extreme position in the Y direction of the carriage 34, the knob 584 serves as a cam to actuate the microswitch 568; and in the other extreme position of the carriage 34 in the Y direction, the knob 586 serves as a cam to actuate the microswitch 570. When the relay 562 is deenergized, as shown in FIG. 15, the motor 304 being energized through the sets of contacts 558 and 560 drives the carriage 34, in the manner as described in FIG. 8, in a direction towards the knob 584. When the microswitch 568 reaches the knob 584, the knob 584 acts as a cam which actuates the microswitch 568. The actuation of the microswitch 568 closes the circuit containing the source of power 566 to energize the relay 562. Upon energization of the relay 562 the motor 304 receives electric current through the sets of contacts 588 and 590 of relay 562, rather than the sets of contacts 558 and 560, with the result that current is applied in the reverse direction to the motor 304 which then rotates in the reverse direction. Since the motor 304 is now rotating in the reverse direction, the carriage 34 is now traveling in a direction away from the knob 584 and towards the knob 586. The energization of the relay 562 by the microswitch 568 has also resulted in a closure of the set of contacts 572 which provides a second path of energization of the relay 562 by the microswitch 570. Thereby, upon motion of the carriage 34 away from the knob 584 and the deactivation of the microswitch 568 the relay 562 remains energized. Accordingly, the successive indexing operation of the carriage 34 are performed with a direction of motion on the carriage 34 away from the knob 584. The carriage 34 reaches the other extreme of this motion; the knob 586 activates the microswitch 570 breaking the second circuit of energization of the relay 562. The deenergization of the relay 562 reverses the direction of current to the motor 304 with the result that the carriage 34 now proceeds to index in the reverse direction towards the knob 584 thus completing the cycle.

It is understood that the above-described embodiment of the invention is illustrative only and that modifications thereof will occur to those skilled in the art. Accordingly, it is desired that this invention is not to be limited to the embodiment disclosed herein but is to be limited only as defined by the appended claims.

What is claimed is:

1. In a radiographic imaging system wherein an image is produced on a photographic film by means of a moving light stylus, the invention comprising:

a light-tight box enclosing said photographic film, said light-tight box having an opening for admitting light from said stylus and a shield adapted to cover said opening for excluding said light;

a structure for supporting said light-tight box in relation to said stylus; and a lock positioned on said light-tight box, said lock comprising an elongated member slidably mounted for engaging alternately said shield or said structure.

2. The device defined by claim 1 wherein said light-tight box is slidably mounted within said structure to permit withdrawal of said light-tight box through an opening in said structure, and said shield is slidably mounted within said light-tight box to permit withdrawal of said shield through said opening.

3. In combination:

means for scanning a source of radiation;

a source of light connected by a mechanical linkage to said scanning means;

a photographic film container adapted to support a photographic film for illumination by said source of light, said container comprising a lock and having a slide for excluding light from the container; and a housing for supporting said container in spaced relation to said source of light, said lock engaging said housing to secure said container within said housing and releasing said slide for exposure of said film by said source of light.

4. A device comprising in combination:

means for scanning a source of radiation;

a source of light connected by a mechanical linkage to said scanning means;

a photographic film container adapted to support a photographic film for illumination by said source of light, said container comprising a lock and having a slide for excluding light from the container;

a housing for supporting said container in spaced relation to said source of light, said lock engaging said housing to secure said container within said housing and releasing said slide for exposure of said film by said source of light; and wherein said source of light emits flashes of light having an intensity related in a predetermined manner to the intensity of said radiation, said device further comprising:

means for varying said predetermined manner; and means for varying a repetition frequency of said light flashes as a function of the scanning speed of said scanning means.

5. The device as defined by claim 4 wherein said mechanical linkage has a predetermined amount of backlash to preclude the formation of a scalloping effect in an image formed on said photographic film by said source of light.

*6. A radiographic imaging system comprising:*

*means for scanning a source of radiation;*

*a source of light;*

*a photographic film container adapted to support a photographic film for illumination by said source of light, said container having a cover for excluding light from the container;*

*a housing for supporting said container in spaced relation to said source of light;*

*means for securing said container to said housing while permitting removal of said cover for exposure of said film by said light;*

*means coupled to said scanning means for digitally counting incidences of said radiation; and*

*means coupled between said counting means and said light source for providing flashes of said light according to a magnitude of the count of said counting means.*

*7. A radiographic imaging system comprising:*

*means for scanning a source of radiation;*

*a source of light;*

*a photographic film container adapted to support a photographic film for illumination by said source of light, said container having a cover for excluding light from the container;*

*a housing for supporting said container in spaced relation to said source of light;*

*means for securing said container to said housing while permitting removal of said cover for exposure to said film by said light;*

*means coupled to said scanning means for digitally counting incidences of said radiation to activate said source of light;*

*means for supporting said source of light, said supporting means directing rays of said light to sequentially illuminate successive points of said film corresponding to said scanning of said radiation; and*

*means coupled to said supporting means for displacing one set of said sequentially illuminated points from a second set of said sequentially illuminated points to preclude the formation of a scalloping effect.*

*8. A radiographic imaging system comprising:*

*means for scanning a source of radiation;*

*a source of light, said light source casting a spot of light having a perimeter delineating a size and shape of said light spot;*

*a photographic film container adapted to support a photographic film for illumination by said source of light, said container having a cover for excluding light from the container;*

*a housing for supporting said container in spaced relation to said source of light;*

*means for securing said container to said housing while permitting removal of said cover for exposure of said film by said light;*

*means coupled to said scanning means for digitally counting incidences of said radiation to activate said source of light; and wherein*

*said light source includes means for varying said perimeter of said light spot.*

*9. A radiographic imaging system comprising:*

*means for scanning a subject emitting radiant energy;*

*a source of illuminating radiation, said source casting a spot of radiation having a perimeter delineating a size and shape of said spot;*

*recording media responsive to said illuminating radiation;*

*means for removably securing said recording media in spaced apart relation to said source of illuminating radiation, said source casting said spot of illuminating radiation upon said media;*

*means coupled between said scanning means and said source of illuminating radiation for digitally counting incidences of said radiant energy to activate said source; and wherein*

*said source of illuminating radiation includes means for varying said perimeter of said spot cast upon said media.*

*10. A system according to claim 9 wherein said counting means includes for storing a count thereof while said counting means counts further incidences of said radiant energy.*

* * * * *